(12) United States Patent
Ramos et al.

(10) Patent No.: US 7,904,495 B2
(45) Date of Patent: *Mar. 8, 2011

(54) REPETITIVE CONTROLLER TO COMPENSATE FOR ODD HARMONICS

(75) Inventors: Jesus Leyva Ramos, San Luis Potosi (MX); Gerardo Escobar, San Luis Potosi (MX)

(73) Assignee: Instituto Potosino De Investigacion Cientifica y Tecnologica, San Luis Potosi (MX)

( * ) Notice: Subject to any disclaimer, the term of this patent is extended or adjusted under 35 U.S.C. 154(b) by 1443 days.

This patent is subject to a terminal disclaimer.

(21) Appl. No.: 11/232,234

(22) Filed: Sep. 22, 2005

(65) Prior Publication Data

US 2007/0067051 A1 Mar. 22, 2007

(51) Int. Cl.
*G06F 17/10* (2006.01)
*G05B 13/02* (2006.01)
(52) U.S. Cl. ......... 708/300; 708/309; 708/311; 700/44; 700/45
(58) Field of Classification Search .......... 700/44, 700/45; 708/300–323
See application file for complete search history.

(56) References Cited

U.S. PATENT DOCUMENTS

| | | | | |
|---|---|---|---|---|
| 4,852,034 A | * | 7/1989 | Takayama | 708/301 |
| 4,920,507 A | * | 4/1990 | Takeda | 708/320 |
| 5,563,794 A | | 10/1996 | Cosner et al. | |
| 5,638,794 A | | 6/1997 | Kubo et al. | |
| 5,740,090 A | * | 4/1998 | Steinbuch et al. | 708/310 |
| 5,856,934 A | * | 1/1999 | Nakajima et al. | 708/300 |
| 7,123,850 B1 | | 10/2006 | Hamby et al. | |
| 7,145,746 B1 | | 12/2006 | Hirano et al. | |
| 7,265,932 B2 | * | 9/2007 | De Hoog | 360/77.04 |
| 2003/0004591 A1 | * | 1/2003 | Fontana et al. | 700/94 |

OTHER PUBLICATIONS

Hara et al, Repetitive Control System: A New Type Servo System for Periodic Exogenous Signals, IEEE Transactions on Automatic Control, vol. 33, No. 7, Jul. 1988.*
Broberg et al, A New Approach to Phase Cancellation in Repetitive Control, Industry Applications Society Annual Meeting, 1994., Conference Record of the 1994 IEEE.*
Steinbuch, Repetitive control for systems with uncertain period-time, Automatica 38 (2002), p. 2103-2109.*

(Continued)

*Primary Examiner* — Lewis A Bullock, Jr.
*Assistant Examiner* — Hang Pan
(74) *Attorney, Agent, or Firm* — Fish & Richardson P.C.

(57) ABSTRACT

A repetitive controller scheme with negative feedback and feedforward introduces infinitely many poles on the imaginary axis located at the resonant peaks. The feedforward introduces zeros, which produce notches located in between two consecutive resonant peaks. The latter has the advantage of making the controllers more selective, in the sense that the original overlapping (appearing at the valleys) or interaction between consecutive resonant peaks is removed by the notches. This would allow, in principle, peaks of higher gains and slightly wider bandwidth, avoiding, at the same time, the excitation of harmonics located in between two consecutive peaks. A negative feedback compensator with feedforward is especially useful when only the compensation of odd harmonics is required, but not the even harmonics, like in many power electronic systems. In contrast, the positive feedback controller would try to reinject, and indeed amplify, any small noise, which has components on the even frequencies. The negative feedback repetitive controller includes a simple Low Pass Filter (LPF). This modification restricts the bandwidth of the controller, and at the same time reinforces the stability when the controller is inserted in a closed-loop system.

10 Claims, 6 Drawing Sheets

OTHER PUBLICATIONS

Lin et al, Compensation of MR Head Non-Linearities Using a Saturable Transfer Function, IEEE Transactions on Magnetics, vol. 36, No. 5, Sep. 2000.*

Bodson et al, Harmonic Generation in Adaptive Feedforward Cancellation Schemes, IEEE Transactions on Automatic Control, vol. 39, No. 9, Sep. 1994.*

Costa-Castello et al, Odd-Harmonic Digital Repetitive Control of a Single-Phase Current Active Filter, IEEE Transactions on Power Electronics, vol. 19, No. 4, Jul. 2004.*

Non-final Office Action in U.S. Appl. No. 11/217,682, mailed Jun. 12, 2009, 7 pages.

* cited by examiner

REPETITIVE CONTROLLER TO COMPENSATE FOR ODD HARMONICS

BACKGROUND

Tracking or rejection of periodic signals is an issue commonly found in power electronics applications, such as switching power supplies, AC/DC converters, motor speed fluctuation, synchronous rectifiers, uninterruptible power supplies ("UPS") and active filters. In these cases, the disturbances and/or input signals are composed of specific higher harmonics of the fundamental frequency of the power source. Repetitive control arises as a practical solution to such issues and is based on the internal model principle. Repetitive control attempts to provide exact asymptotic output tracking of periodic inputs or rejection of periodic disturbances. The internal model principle states that the controlled output can track a class of reference commands without a steady state error if the generator, or the model, for the reference is included in a stable closed-loop system. Therefore, according to the internal model principle, if a periodic disturbance has an infinite Fourier series (of harmonic components), then an infinite number of resonant filters are required to reject the disturbance. For a detailed description of internal model principle, reference is made to B. Francis and W. Wonham, "The internal model principle for linear multivariable regulators," Applied Mathematics and Optimization, Vol. 2, pp. 170-194, 1975, which is incorporated by reference. For a description of a stability study of linear infinite dimensional repetitive controllers, reference is made to S. Hara, Y. Yamamoto, T. Omata and M. Nakano, "Repetitive control systems: A new type servo systems and its applications," IEEE Trans. Automat. Contr., Vol. 33, No. 7, pp. 659-667, 1988 and the numerous references therein.

Fortunately, in the repetitive control approach, a simple delay line in a proper feedback array can be used to produce an infinite number of poles and thereby simulate a bank of an infinite number of resonant filters, leading to system dynamics of infinite dimension. Repetitive control may have many applications on power electronic systems such as rectifiers, inverters and active filters. The use of repetitive control for a reduction of periodic disturbances with frequencies corresponding to the specific frequencies is disclosed in U.S. Pat. No. 5,740,090, where the transfer function of the controller includes an infinite number of poles, with no zeros introduced between the poles.

SUMMARY

Repetitive techniques may offer some advantages over conventional solutions, particularly in active filters and inverters. A positive feedback scheme may be used to implement the repetitive controller, such as by placing a delay line in the direct path and others in the feedback path. It is important to note that a positive feedback structure may have the disadvantage of compensating for every harmonic, including odd and even harmonics and the dc component, if any. Moreover, depending on the position of the delay line in the structure, the delay line may even modify the phase shift, which may result in a need for some extra filters to alleviate this problem. The use of repetitive control for compensation of all harmonics with frequencies corresponding to the specific frequencies is disclosed in co-pending U.S. application Ser. No. 11/217,682, which was filed on Sep. 2, 2005, is titled "REPETITIVE CONTROLLER FOR COMPENSATION OF PERIODIC SIGNALS", and is incorporated by reference. In this application, a repetitive controller scheme with positive feedback and feedforward introduces infinitely many poles on the imaginary axis located at both even and odd harmonics (including a pole in the origin) and zeros between the poles.

Although the positive feedback based scheme may apparently solve the harmonics compensation problem, it may lead to more distortion in certain cases. Consider, for instance, a system where even harmonics do not exist originally, like in many power electronic systems. In this case, the positive feedback repetitive controller would tend to amplify, and even reinject, any low level noise having components on the even frequencies. This evidently has the danger of producing responses polluted with such harmonics which were not present before.

As described in more detail below, a negative feedback approach with feedforward, in contrast to the positive feedback approach, compensates only for the odd harmonics, and thereby reduces the possibility of reinjecting unnecessary distortion into the system. Moreover, it has been found that placing a delay line in the feedback trajectory may result in better phase characteristics.

An experimental result of a setup implemented in the laboratory is also given. The circuitry used here can reproduce the same frequency response as an infinite set of resonant filters tuned at higher odd harmonic frequencies of the fundamental.

In one general aspect, a repetitive controller employs negative feedback and feedforward. This repetitive controller compensates only for the odd harmonics, and thereby reduces the possibility of reinjecting unnecessary distortion into the system. The feedforward path considerably improves the frequency response and performance, and provides higher gains with enhanced selectivity. This approach may be particularly useful, and may generate cleaner responses than traditional positive feedback based repetitive schemes, in applications of power electronic systems containing mainly odd harmonics. A description of the approach and corresponding experimental frequency responses are given.

Other forms, features, and aspects of the above-described methods and system are described in the detailed description that follows.

(from top to bottom): output y(t) with feedforward, output y(t) without feedforward, and input u(t).

DETAILED DESCRIPTION

Figure 1:
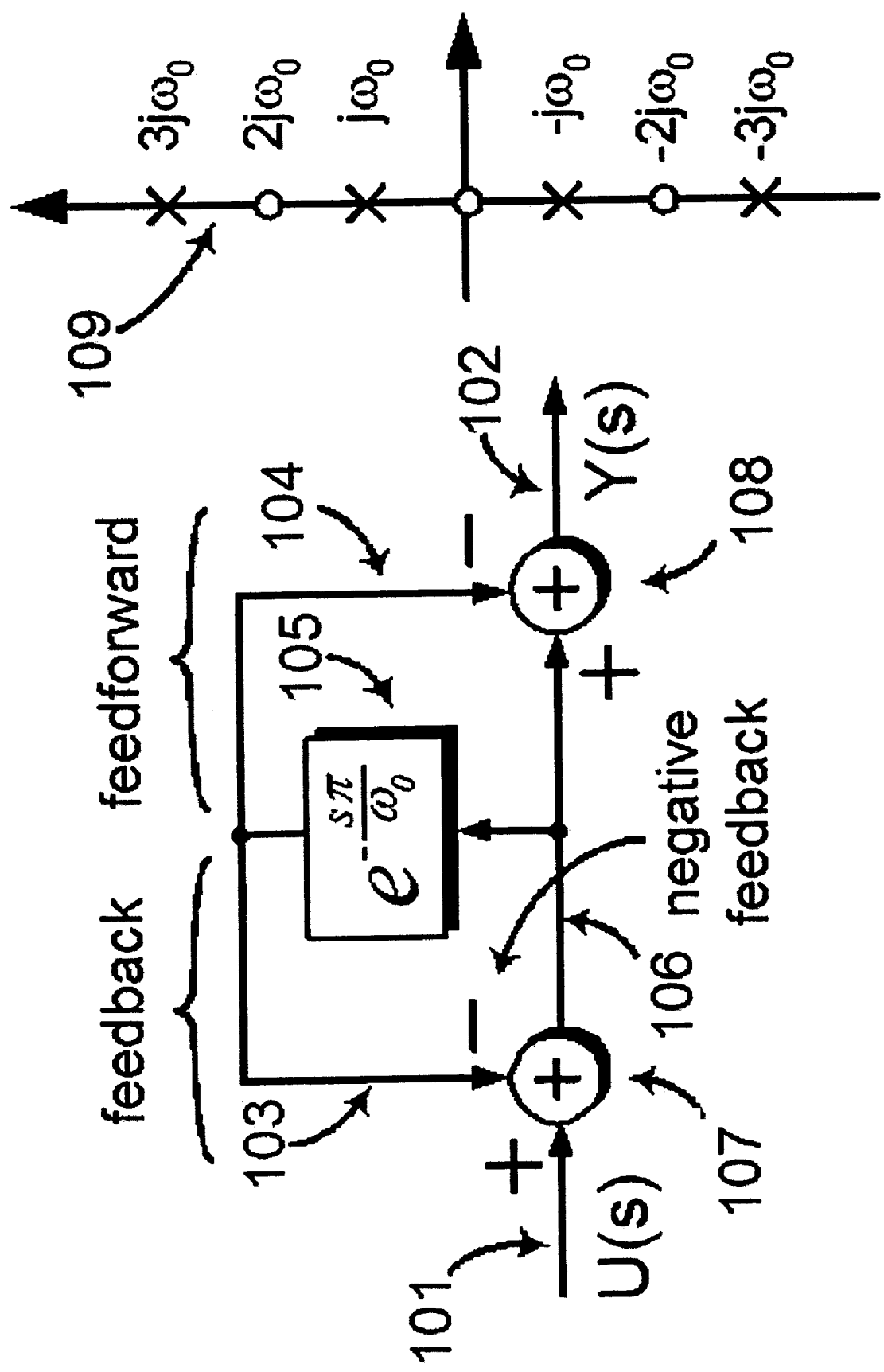
FIG. 1 is a block diagram of a repetitive controller with negative feedback and feedforward.

The block diagram of the proposed repetitive controller with negative feedback 103 and including the feedforward 104 is shown in FIG. 1. The resulting transfer function is:

$$G(s) = \frac{Y(s)}{U(s)} = \frac{1 - e^{-\frac{s\pi}{\omega_o}}}{1 + e^{-\frac{s\pi}{\omega_o}}}$$

where U(s) 101 is the input, Y(s) 102 is the output, and $\omega_0$ represents, throughout this document, the fundamental frequency of the periodic signal under compensation. An adder 107 outputs a signal 106, which is the addition of the input signal with the feedback. Another adder 108 outputs a signal, which is the addition of the feedforward, and the signal from the previous adder 106. Notice that the delay line is represented by a block 105, with s being the Laplace operator, e being the basic value of the natural logarithm and the delay time being $t_d = \pi/\omega_o$.

The poles of the repetitive controller can be found from $e^{-s\pi/\omega_o} = -1$. Notice that the complex number $e^{-s\pi/\omega_o}|_{s=j\omega}$ equals $-1$ for $\omega = (2k-1)\omega_o$ for every k=0, 1, 2, ..., and $e^{-s\pi/\omega_o}|_{s=j\omega}$ equals 1 for $\omega = 2k\omega_o$ for every k=1, 2, 3, ... Due to the delay line, this transfer function has infinitely many poles on the imaginary axis 109. Notice that, with the introduction of the feedforward path, an infinite number of zeros also appear on the imaginary axis 109. The corresponding transfer functions for the compensator can also be written as:

$$G(s) = \frac{1 - e^{-\frac{s\pi}{\omega_o}}}{1 + e^{-\frac{s\pi}{\omega_o}}} = \frac{e^{-\frac{s\pi}{2\omega_o}} - e^{-\frac{s\pi}{2\omega_o}}}{e^{\frac{s\pi}{2\omega_o}} + e^{-\frac{s\pi}{2\omega_o}}}$$

or equal to $$= \frac{\sinh\left(\frac{s\pi}{2\omega_o}\right)}{\cosh\left(\frac{s\pi}{2\omega_o}\right)} = \frac{\frac{s\pi}{2\omega_o} \prod_{k=1}^{\infty}\left(\frac{s^2}{(2k)^2\omega_o^2} + 1\right)}{\prod_{k=1}^{\infty}\left(\frac{s^2}{(2k-1)^2\omega_o^2} + 1\right)}$$

Notice that the negative feedback compensator contains harmonic oscillators tuned only at odd harmonics of the fundamental frequency $\omega_o$. That is, for G(s), the poles are located at odd harmonics of $\omega_o$, and there is no pole at the origin (see FIG. 2). Notice also that each zero of G(s) lies exactly in the middle point between two consecutive poles including a zero in the origin.

Conversely, if the fundamental frequency is known, then the delay time is computed using $t_d = \pi/\omega_o = \frac{1}{2}f_o$, where $\omega_o = 2\pi f_o$. For instance, if compensation of harmonics of 120 Hz is required, taking $f_o = 120$ Hz, then the corresponding delay is $t_d = 4.166$ ms.

Figure 2:
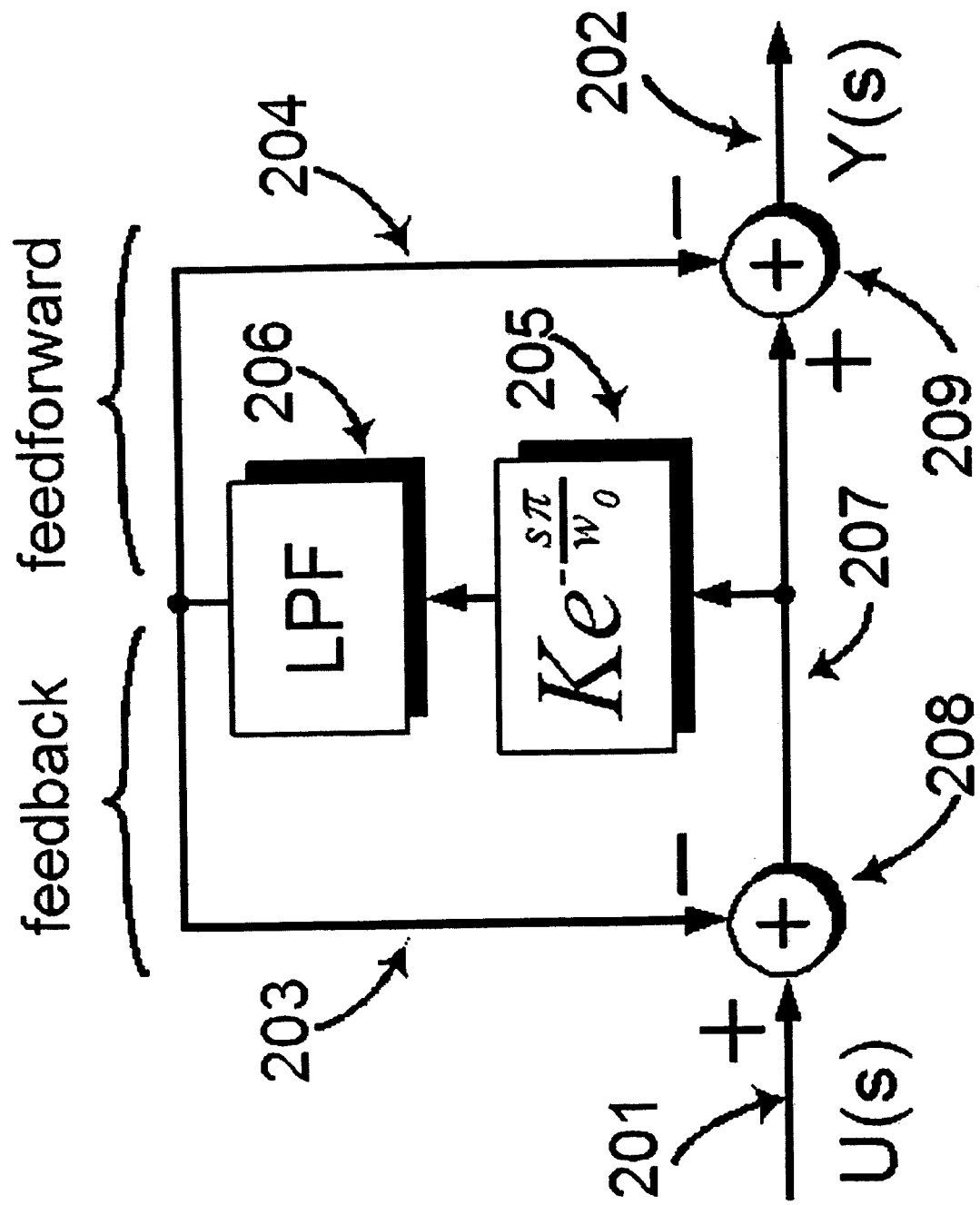
FIG. 2 is a block diagram of practical modifications for the repetitive controller described herein.

The above repetitive controller, however, may be unsuited for use in a real application. The expected Bode plots for the controller consist of a set of peaks centered at the harmonic frequencies. Moreover, thanks to the presence of the zeros, notches appear in the middle points between two consecutive peaks. The gain at the resonant frequencies is, in theory, infinite, while for the notches it goes to zero (minus infinite in dB); therefore, instability problems may arise. To alleviate this issue, damping is added to all the poles/zeros by slightly shifting them to the left of the imaginary axis. As a consequence of this simple pole/zero shifting process, the peaks' amplitude becomes bounded. This shifting process is realized as follows: G(s)=G(s+a). Applying the shifting to the exponential term results in $e^{-(s+a)\pi/\omega_o} = e^{-a\pi/\omega_o}e^{-s\pi/\omega_o}$. Notice that this is equivalent to multiply the exponential function by a gain factor $K = e^{-a\pi/\omega_o}$ as shown in FIG. 2. Hence, by proposing a gain K>1 the poles/zeros move to the right, but if 0<K<1 then they move to the left. Moreover, it is easy to show that the resonant peaks, originally of infinite magnitude, reach a maximum magnitude of (1+K)/(1−K), while the notches reach a minimum magnitude of (1−K)/(1+K).

It can be notice that without feedforward the maximum attainable gain is 1/(1−K), which is evidently smaller than the one considering feedforward. Moreover, in this case there are simply valleys between the peaks whose minimum attainable gains are 1/(1+K), and no longer notches.

It is also recommended, in repetitive control schemes, to include a simple Low Pass Filter (LPF) as shown in FIG. 2 where U(s) 201 is the input, Y(s) 202 is the output, and $\omega_0$ represents the fundamental frequency of the periodic signal under compensation. An adder 208 outputs a signal 207, which is the addition of the input signal with the feedback 203. Another adder 209 outputs a signal, which is the addition of the feedforward 204, and the signal from the previous adder 207. Notice that the block 205 contains the delay line and the gain K and block 206 represents the LPF.

The addition of the LPF restricts the bandwidth of the controller while simultaneously reinforcing the stability when the controller is installed in the closed-loop system. However, it may produce some slight inaccuracies as described next. As a consequence of all these modifications, two side effects appear: first, resonant peaks and notches are slightly shifted with respect to the corresponding harmonic frequency, and second, an almost imperceptible phase shift appears at the tuned harmonic frequencies.

Figure 3:
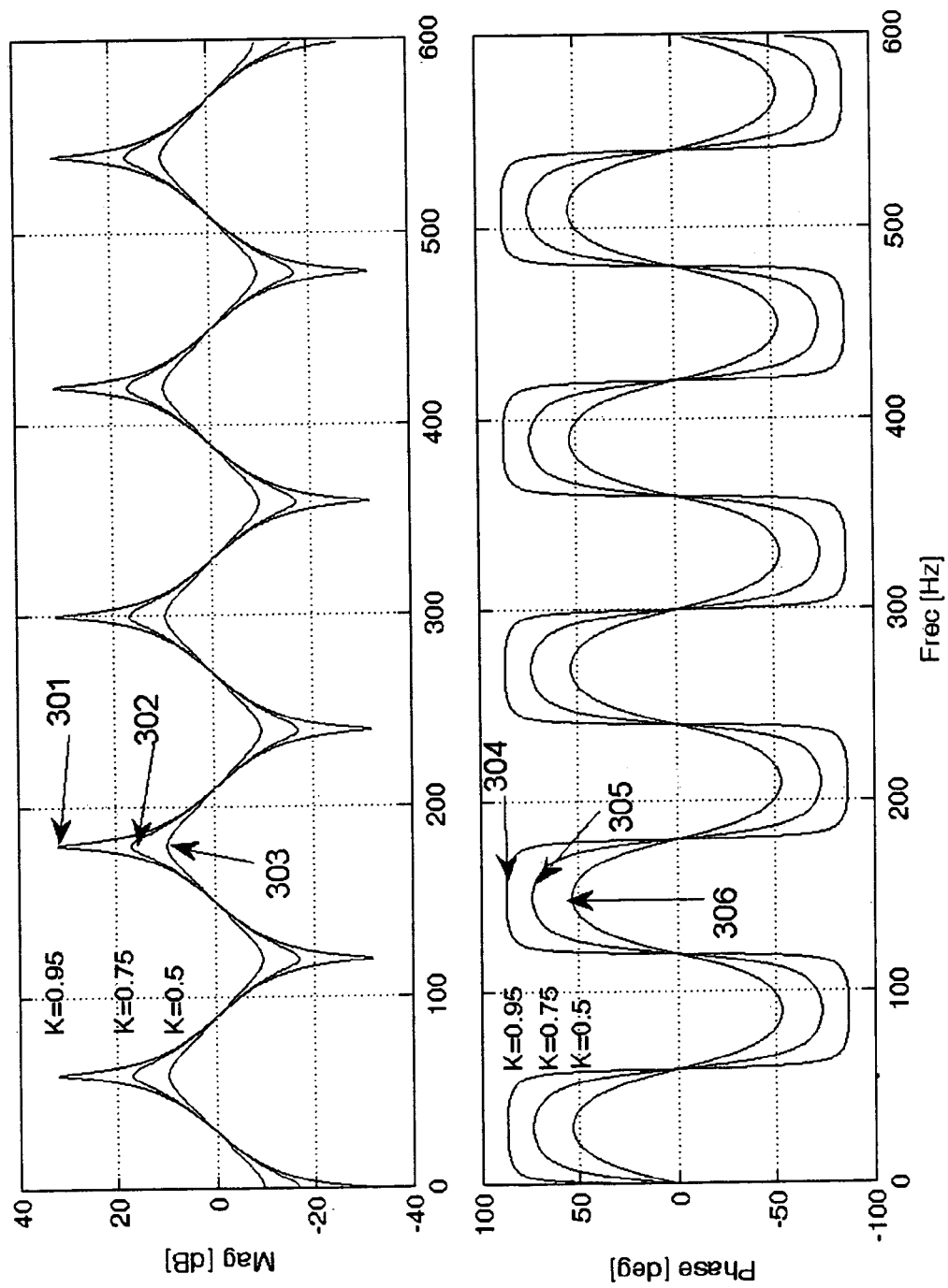
FIG. 3 shows theoretical Bode plots of the repetitive controller for different values of K (0.95, 0.75, and 0.5). (top) magnitude (y-axis dB, x-axis Hz), and (bottom) phase (y-axis deg, x-axis Hz).

FIG. 3 shows the theoretical Bode plots of G(s) for the compensation of harmonics of 120 Hz and for several values of K. In this case, the delay time is fixed to $t_d = 4.166$ ms for the repetitive controller. For K=0.95, the plot 301 goes from 31.82 dB at the resonant frequencies to −31.82 dB at the notches. However, if the gain is reduced to K=0.75, the corresponding maximum and minimum magnitudes for the plot 302 are 16.90 dB and −16.90 dB, respectively. A further reduction to K=0.5 results in maximum and minimum magnitudes for the plot 303 of 9.54 dB and −9.54 dB, respectively. These plots show clearly that, as gain K decreases, the peak amplitude is reduced while the bandwidth of each peak increases, thus increasing its robustness with respect to frequency variations. Notice that the phase plots 304, 305 and 306 have the interesting feature that the phase shift is zero exactly at the resonance frequency and are bounded by 90 and −90 degrees.

An analog circuit implementing the negative feedback controller with feedforward has been built in the laboratory for experimental test. The delay line appearing in the repetitive scheme has been implemented using a special purpose delay line IC. In many power electronics applications, compensation of harmonics for 120 Hz and 60 Hz are required. As a result, delays ranging from $t_d = 4.166$ ms to $t_d = 8.33$ ms should be implemented. For the experimental tests presented here, the compensation of harmonics of 120 Hz has been chosen. Therefore, a delay of $t_d = 4.166$ ms is implemented for the negative feedback controller. It also is clear that a digital implementation could be implemented. In this case, the discretization of the delay line is a simple task, and it is enough to guarantee a relatively large memory stack where data could be stored to be released after a time delay.

Figure 4:
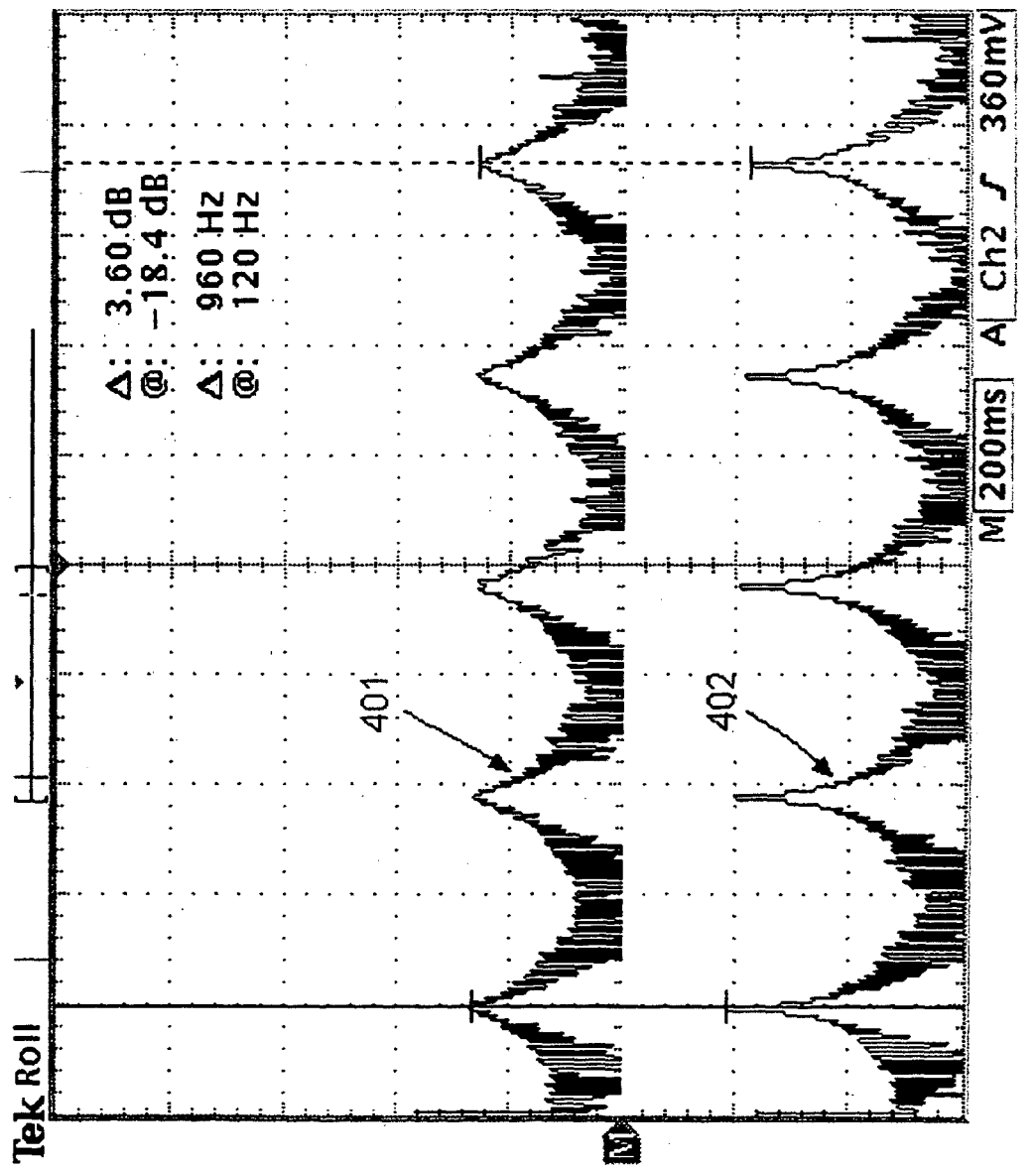
FIG. 4 shows an experimental frequency response for the negative feedback compensator with feedforward (x-axis 125 Hz/div and y-axis 20 dB/div): (top) K=0.824, and (bottom) K=0.955.

The experimental frequency response of output y(t), for the negative feedback compensators with feedforward, is shown in FIG. 4 for K=0.824 401 and K=0.955 402. The plots show that the circuit contains peaks centered at the expected values, i.e., odd harmonics of 120 Hz.

Figure 5:
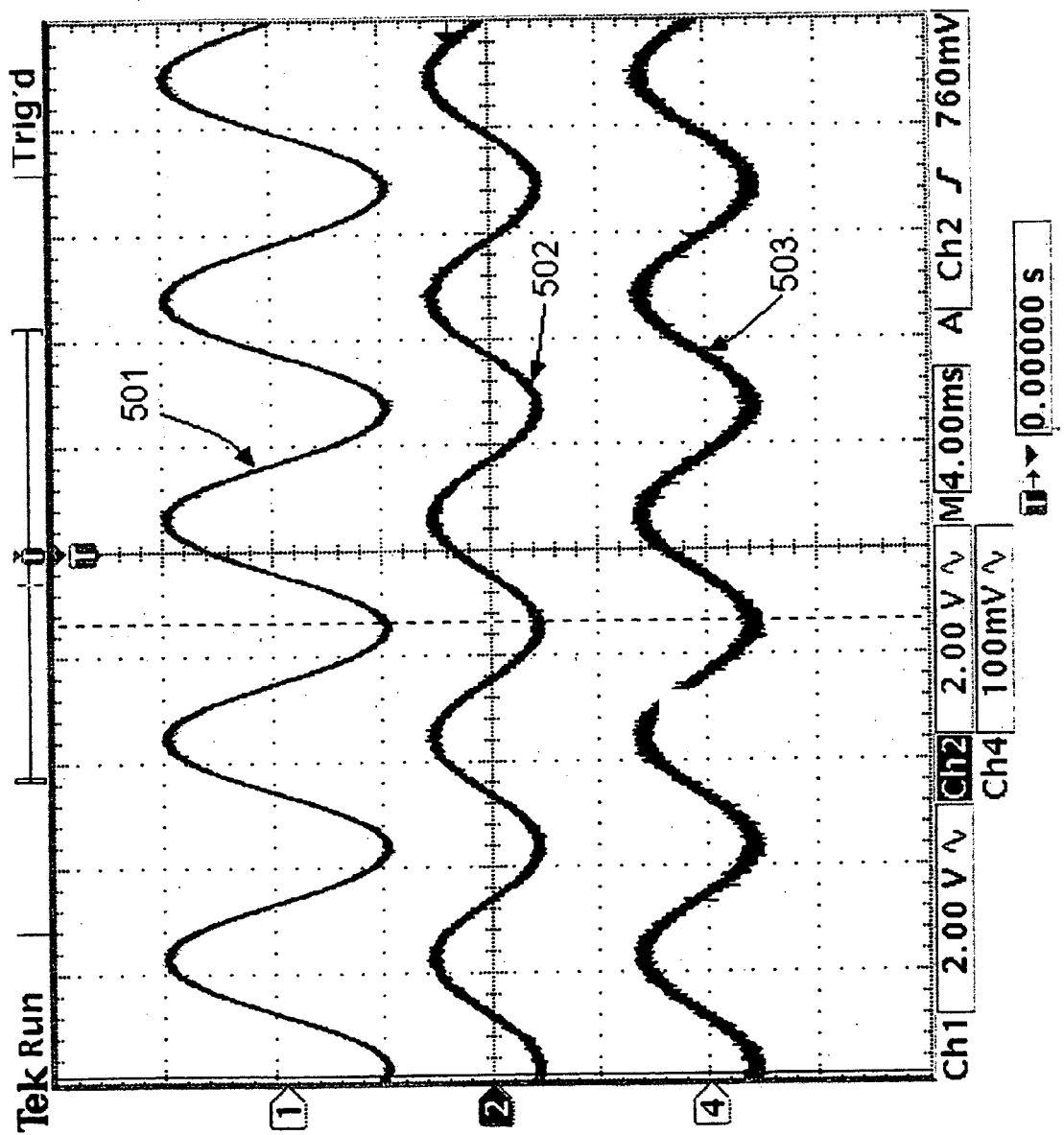
FIG. 5 shows an experimental time response for the negative feedback compensator to a sinusoidal signal of frequency 120 Hz and amplitude 50 mV (x-axis 4 ms/div). (from top to bottom): output y(t) with feedforward (y-axis 2 V/div), output y(t) without feedforward (y-axis 2 V/div), and input u(t) (y-axis 100 mV/div).

FIG. 5 shows the responses to an input sinusoidal signal with 50 mV of amplitude and 120 Hz of frequency. The figure shows, from top to bottom, the responses of the output y(t) with feedforward 501, the output y(t) without feedforward 502, and the input u(t) 503. It can be observed that the output y(t) with feedforward compensation reaches amplitude of 2 V, which corresponds to 32 dB of gain, bigger than the 26 dB obtained without feedforward compensation where the output reaches only 1 V of amplitude. Notice that these values are very close to those obtained theoretically.

Figure 6:
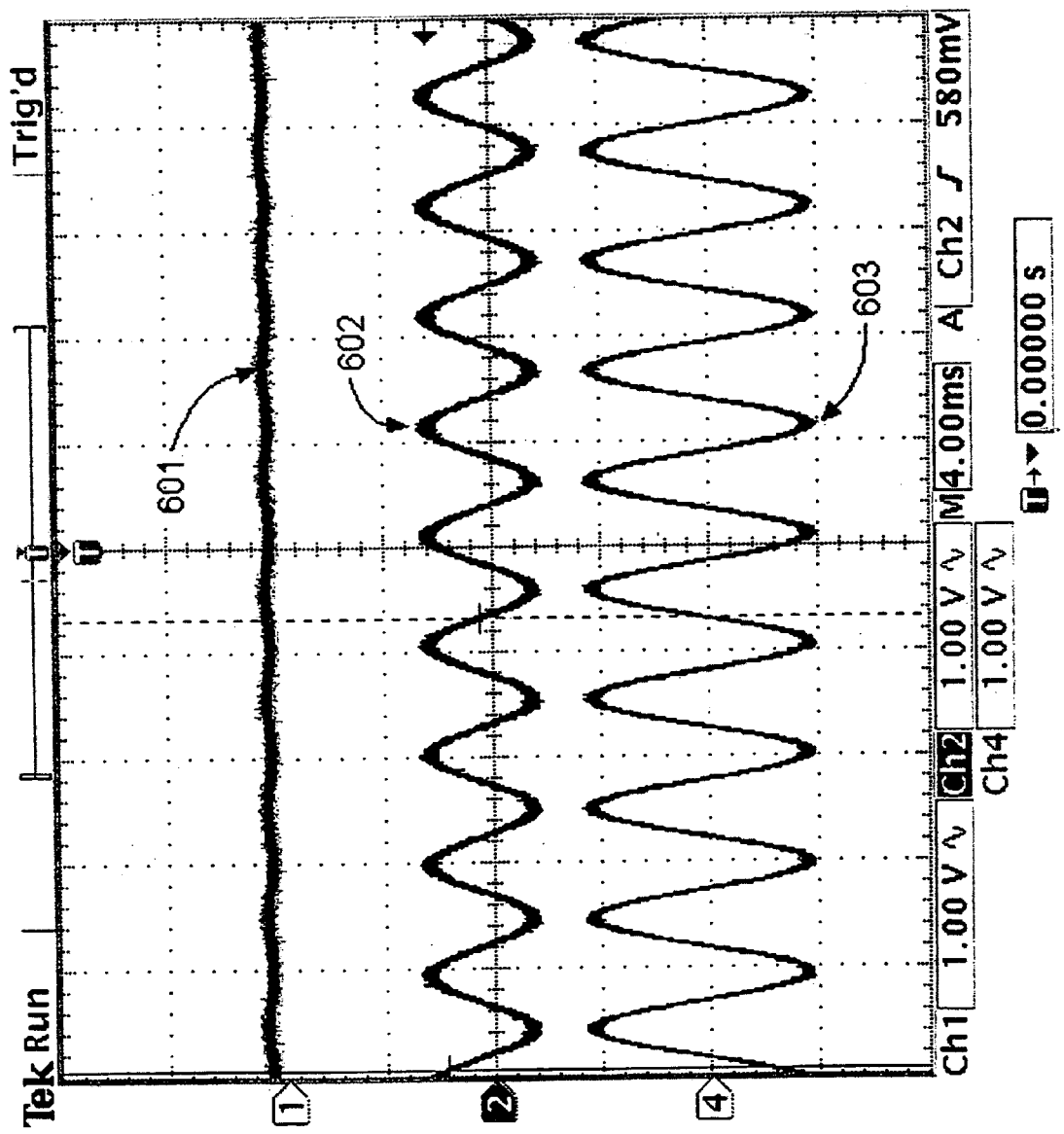
FIG. 6 shows an experimental time response for the negative feedback compensator to a sinusoidal signal of frequency 240 Hz and amplitude 1 V (x-axis 4 ms/div), (y-axis 1 V/div).

FIG. 6 shows the responses to an input sinusoidal signal with amplitude 1 V and frequency 240 Hz, that is, coinciding with the frequency of the notch located between peaks of 120 Hz and 360 Hz. The figure shows, from top to bottom, the responses of the output y(t) with feedforward 601, the output y(t) without feedforward 602, and the input u(t) 603. As expected, the gain obtained with feedforward compensation reaches −30.45 dB of gain approximately; the output scarcely reaches 0.03 V of amplitude. This gain is clearly much smaller compared to the one obtained without feedforward compensation −6.02 dB, where the output reaches 0.5 V of amplitude. For the sake of comparison, the same vertical and horizontal scales have been preserved in this figure.

What is claimed is:

1. A repetitive controller with negative feedback and feedforward, the repetitive controller including:
    a first adder,
    a second adder, and
    a time delay circuit for imparting a time delay,
    wherein the first adder receives an input periodic signal inputted into the controller for compensation and also receives a feedback signal,
    wherein the first adder outputs a first output signal corresponding to a subtraction of the feedback signal from the input periodic signal,
    wherein the second adder receives the first output signal and a feedforward signal,
    wherein the second adder outputs a controller output signal, the controller output signal corresponding to a subtraction of the feedforward signal from the first output signal and the controller output signal corresponding to the input periodic signal after being compensated by the repetitive controller,
    wherein the feedforward signal corresponds to the first output signal delayed by the time delay circuit,
    wherein the feedback signal corresponds to the first output signal delayed by the time delay circuit,
    wherein the controller further applies a gain factor of K,
    wherein the feedforward signal corresponds to the first output signal delayed by the time delay circuit and modified by the gain factor of K,
    wherein the feedback signal corresponds to the first output signal delayed by the time delay circuit and modified by the gain factor of K,
    wherein the application of the gain factor of K adds damping to the repetitive controller by slightly shifting all poles and zeros of a transfer function of the repetitive controller to a location on an s-plane that is left of an imaginary axis of the s-plane, such that a peak amplitude becomes bounded and, in effect, the gain factor of K is applied, and
    wherein resonant peaks of the transfer function as displayed in a Bode plot reach a maximum magnitude of (1+K)/(1−K), and notches of the transfer function as displayed in the Bode plot reach a minimum magnitude of (1−K)/(1+K) when 0<K<1.

2. The repetitive controller of claim 1, wherein the time delay circuit is implemented in analog form.

3. The repetitive controller of claim 1, wherein the time delay circuit is implemented in digital form.

4. The repetitive controller of claim 1, wherein the controller has a transfer function given by:

$$G(s) = \frac{Y(s)}{U(s)} = \frac{1 - Ke^{-\frac{s\pi}{\omega_o}}}{1 + Ke^{-\frac{s\pi}{\omega_o}}}$$

where s is a Laplace operator, Y(s) represents the controller output signal, U(s) represents the input periodic signal, and $\omega_o$ represents the fundamental frequency of the input periodic signal under compensation where the corresponding time delay is given by $t_d = \pi/\omega_o = \frac{1}{2}f_o$.

5. The repetitive controller of claim 1,
    wherein, due to the time delay circuit imparting a delay to the first output signal for the feedforward signal and for the feedback signal, the controller has a transfer function with an infinite number of poles located left of an imaginary axis of an s-plane at $\omega=(2k-1)\omega_0$ for every k=0,1, 2, . . . , and an infinite number of zeros located left of the imaginary axis at $\omega=2k\omega_o$ for every k=1,2,3, . . . , and
    wherein $\omega_o$ represents a fundamental frequency of the input periodic signal inputted into the controller for compensation.

6. The repetitive controller of claim 1,
    wherein the controller has a transfer function having a first pole on an s-plane that lies at $\omega_o$ and infinite other poles that lie at odd harmonics of $\omega_o$, the transfer function further having infinite zeros on the s-plane that each lie exactly in a middle point between two consecutive poles of the transfer function, and wherein $\omega_o$ represents a fundamental frequency of the input periodic signal inputted into the controller for compensation.

7. The repetitive controller of claim 1, wherein the controller has an expected Bode plot that includes, due to presence of poles in a transfer function of the repetitive controller, a set of peaks centered at odd harmonic frequencies of a fundamental frequency of the input periodic signal; and due to presence of zeros in the transfer function of the repetitive controller, a set of notches, each notch in the set of notches appearing at a middle point between two consecutive peaks of the set of peaks, such that gain at resonant frequencies is substantially-infinite at each of the peaks of the set of peaks and zero at each of the notches of the set of notches.

8. The repetitive controller of claim 1, wherein the controller further includes a simple Low Pass Filter (LPF) to restrict a bandwidth of the controller, and at the same time reinforce stability when the controller is inserted into a closed-loop system.

9. The repetitive controller of claim 8,
    wherein the feedforward signal corresponds to the first output signal delayed by the time delay circuit, modified by the gain factor of K, and filtered by the simple LPF, and wherein the feedback signal corresponds to the first output signal delayed by the time delay circuit, modified by the gain factor of K, and filtered by the simple LPF.

10. The repetitive controller of claim 1,
wherein the time delay $t_d$ is equal to $\pi/\omega_o$, and wherein $\omega_o$ represents a fundamental frequency of the input periodic signal inputted into the controller for compensation.

* * * * *